United States Patent [19]
Nower

[11] Patent Number: 5,980,094
[45] Date of Patent: Nov. 9, 1999

[54] ANALYSIS OF ALIGNMENT DATA

[75] Inventor: Daniel L. Nower, Knoxville, Tenn.

[73] Assignee: CSI Technology, Inc., Wilmington, Del.

[21] Appl. No.: 08/827,576

[22] Filed: Mar. 28, 1997

[51] Int. Cl.$^6$ .............................. G01B 5/25; G01B 7/31
[52] U.S. Cl. ................... 364/528.14; 364/528.1; 364/474.34; 356/153; 356/139.04; 356/141.3; 356/399; 33/412; 33/645; 33/613
[58] Field of Search ................ 364/528.14, 528.1, 364/474.34, 474.35–474.36; 702/56, 33; 33/412, 645, 661, 613, 655, 533, 286; 345/442; 356/153, 138, 399, 373, 400, 139.04, 141.2, 141.3

[56] References Cited

U.S. PATENT DOCUMENTS

| | | | |
|---|---|---|---|
| 5,026,998 | 6/1991 | Holzl | 250/561 |
| 5,056,237 | 10/1991 | Saunders | 33/645 |
| 5,115,406 | 5/1992 | Zatezalo et al. | 364/528.14 |
| 5,185,937 | 2/1993 | Piety et al. | 33/645 |
| 5,263,261 | 11/1993 | Piety et al. | 33/645 |
| 5,371,953 | 12/1994 | Nower et al. | 33/645 |
| 5,526,282 | 6/1996 | Nower et al. | 364/528.14 |
| 5,544,073 | 8/1996 | Piety et al. | 364/528.14 |
| 5,566,288 | 10/1996 | Koerhsen | 345/442 |
| 5,621,655 | 4/1997 | Nower et al. | 364/528.14 |
| 5,684,578 | 11/1997 | Nower et al. | 356/141.3 |
| 5,744,723 | 4/1998 | Piety | 73/660 |

OTHER PUBLICATIONS

"Shaft Alignment Handbook", Second Edition, J. Piotrowski, Copyright 1995, pp. 219–221.
"The Simplified Handbook of Vibration Analysis", volume One, A. Crawford, Copyright 1992. pp. 129–130.
"Alignment Manual for Horizontal, Flexibly Coupled Rotating Machines", Third Edition, A. Murray, Jr., Copyright 1983. pp. 46–46A.

Primary Examiner—James P. Trammell
Assistant Examiner—Tuan Q. Dam
Attorney, Agent, or Firm—Luedeka, Neely & Graham, PC

[57] ABSTRACT

Alignment data is analyzed to determine machine condition information that is not necessarily related to alignment. Alignment fixtures provide alignment data to an analyzer that finds a curve of a predetermined type, such as a sine curve, that best fits the data. A confidence factor is calculated indicating the probability that the alignment data corresponds to misalignment. The alignment data is further analyzed to determine a condition, other than misalignment, that contributed to the magnitudes of the alignment data. Preferably, the analyzer is used to check for machine conditions such as looseness in the machine, rubs, and spall defects in a bearing. Preferably, the condition analysis is based on both the confidence factors and curve parameters, such as phase, offset and amplitude of a sine curve. In the condition analysis mode, the analyzer provides both manual and automatic routine for removing selected segments of data to produce trial data sets that are analyzed to determine machine conditions.

43 Claims, 7 Drawing Sheets

ANALYSIS OF ALIGNMENT DATA

FIELD OF INVENTION

The present invention relates to the analysis of alignment data and specifically relates to a method and apparatus for analyzing alignment data to determine the condition of machines.

A variety of techniques and devices have been developed for determining whether two coupled shafts are properly aligned. Typically, such devices would include brackets that are fitted to the coupled shafts to produce alignment data that will indicate the misalignment of the shafts in terms of both offset and angularity. Some techniques for acquiring alignment data provide for placing alignment brackets on the coupled shafts, rotating the alignment brackets through a number of rotational positions relative to the rotational center axis of the shaft, and taking a measurement at a number of the rotational positions. A curve of a predetermined type, preferably a sine curve, is found that best fits the alignment data using a correlation technique, such as a least square fit technique. Typically, it is then assumed that the curve best represents accurate alignment data and the curve is used only to determine how the shafts should be moved to improve the alignment condition.

SUMMARY OF INVENTION

In accordance with the present invention, alignment data and a curve of a predetermined type, such as a sine curve, that best fits the alignment data is further analyzed to determine machine condition information that is not necessarily related to alignment or misalignment of the shafts. In accordance with the method and apparatus of the present invention, alignment fixtures are placed on first and second coupled shafts and are used to produce alignment data composed of a plurality of data points purportedly corresponding to the misalignment between the first and second shafts measured at a plurality of rotational positions relative to the shafts. Each data point would include a rotational position, preferably measured in degrees from top dead center or a reference bolt, and would include a magnitude or value change corresponding to the displacement of at least one shaft rotational center line in the radial direction as the fixtures are rotated around the shaft. The alignment data is input to an alignment analyzer that finds a curve of a predetermined type, preferably a sine curve, that best fits the alignment data. The analyzer also analyzes the alignment data and the best fit curve to produce a confidence factor indicating the probability that the alignment data actually corresponds to the misalignment of the first and second shafts. This confidence factor is then output through an output device associated with the analyzer, such as a display, a meter, an LED indicator or a data output port.

In the preferred embodiment of the invention, the analyzer further analyzes the alignment data and curve to determine a condition, other than misalignment, that contributed to the magnitudes of the alignment data. This condition is identified in a condition signal that is transmitted to the output. Preferably, the analyzer analyzes the alignment data to determine whether the data may be produced or affected by loose fitting brackets on the shafts, loosely secured machines, rubs internal to a machine, spall defects in a bearing, or other potential problems in a machine.

To determine the confidence factor, the analyzer preferably begins by determining a percentage correlation between the best fit sine curve and the alignment data. Then, the correlation is reduced by an adjustment factor inversely proportional to the number of data points and is further reduced by an adjustment factor inversely proportional to the spacing between the data points. An adjustment factor is then generated having a magnitude that is inversely proportional to the spacing (the value representing spacing), and this adjustment factor is used to reduce the confidence factor.

In accordance with another aspect of the present invention, the analyzer includes means for deleting selected ones or segments of data points from the alignment data to produce a trial data set of alignment data. The analyzer allows for manual selection of data points to be deleted from the alignment data to produce a trial set of alignment data, and it also provides for automatic selection of a number of trial sets of alignment data.

The trial data sets of alignment data are further analyzed to determine whether any of the trial data sets produces a high confidence factor where the original alignment data produced a low confidence factor. If so, the analyzer produces a signal indicating that a rotationally isolated mechanical fault exists in the machine and selectively produces a mechanical fault signal for being transmitted to the output indicating that such rotationally isolated mechanical fault does exist. In the preferred embodiment, the analyzer also determines curve parameters and the analysis of the data for a mechanical fault is based in part on the curve parameters.

Preferably, if a rotationally isolated fault exists, the analyzer further analyzes the trial set of data to determine whether the rotationally isolated mechanical fault is related to a bearing fault, such as a spall, or a machine component fault, such as a rub. The difference between a bearing fault and a machine fault is determined in part by comparing the rotational distance occupied by the data that was removed from the alignment data (or the rotational distance of the trial set of alignment data) to predetermined criteria. If this rotational space of the removed data exceeds a predetermined value, the fault is probably a machine fault, such as a rub, not a bearing spall. Next, the analyzer compares the amplitude of the sine wave that best fits the trial set of data to a threshold. If the amplitude is above the threshold, the fault is probably a machine fault. If the amplitude is below the threshold, the fault is probably a bearing fault. If both of the aforementioned analyses suggest the same type of fault, the analyzer produces an output signal indicating the type of fault that probably exists.

If the user is unable to generate a trial set of alignment data having a high confidence factor, either manually or automatically, such condition suggests looseness in either the brackets or the machine itself. If the analyzer is unable to find a trial set of data that produces a high confidence factor, it will output an indication that the brackets and machine should be checked for looseness. By first tightening the brackets and retaking the data, the user can usually determine whether loose brackets actually contributed to the alignment data problem.

If the brackets were not loose, and the machine was loose, this will be indicated by the fact that tightening the brackets and retaking the data does not significantly change the results of the analysis of the data. Machine looseness can be caused by loose holddown bolts, which can be checked by tightening the bolts and retaking the data. If looseness still persists, it is internal to the machine.

BRIEF DESCRIPTION OF THE DRAWINGS

The present invention may best be understood by reference to drawings illustrating a preferred embodiment in which.

DESCRIPTION OF THE DRAWINGS

Figure 1:
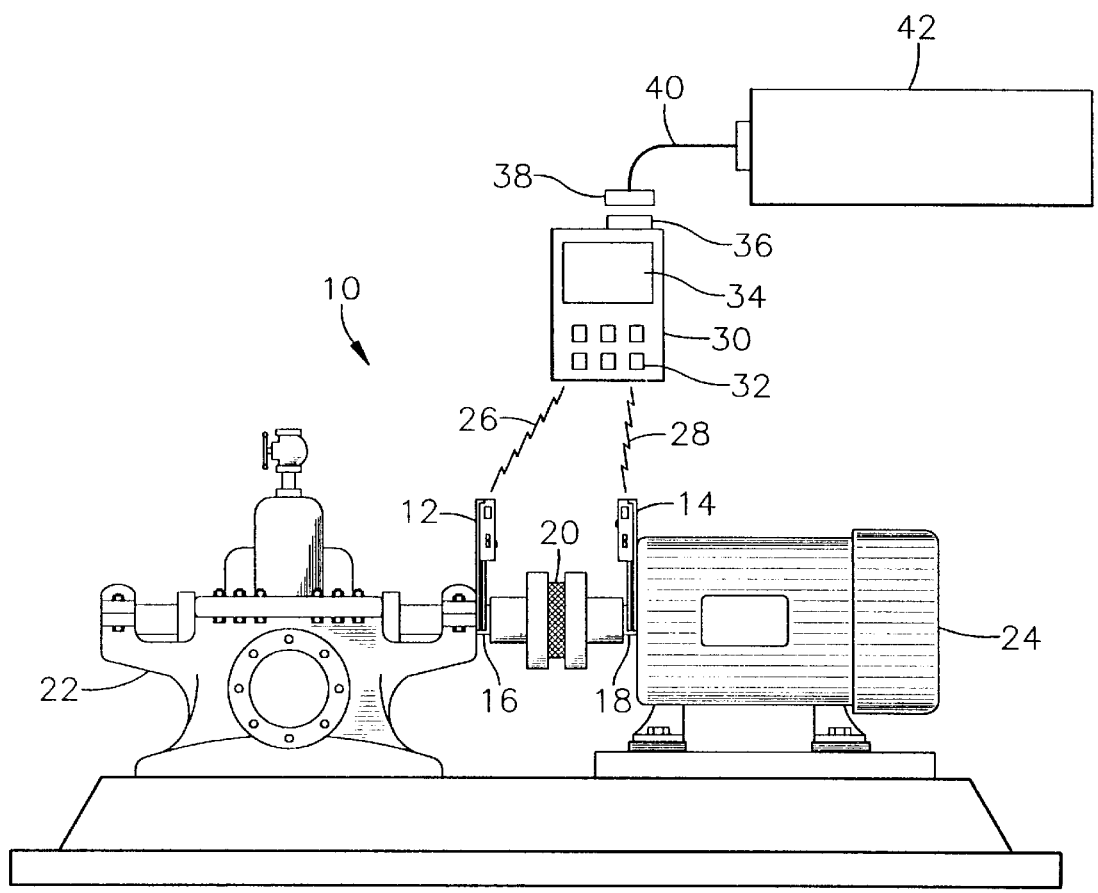
FIG. 1 diagrammatically represents alignment brackets mounted on coupled shafts transmitting data to an alignment analyzer that may be connected to a base computer.

Referring now to the drawings in which like reference characters designate like or corresponding parts throughout the several views, an alignment system 10 is shown diagrammatically in FIG. 1. The system 10 includes a pair of alignment brackets 12 and 14 mounted on shafts 16 and 18, respectively, that are coupled together by a coupling 20. The alignment brackets 12 and 14 are intended to represent a variety of different types and styles of alignment bracket systems, including brackets that use a reverse dial indicator method or a rim and face method of obtaining alignment data. Thus, the brackets 12 and 14 may represent a mechanical bracket system, such as described in U.S. Pat. No. 5,263,261, but most preferably the brackets 12 and 14 represent laser fixtures such as CSI Model 8210 Laser Fixtures that include internal inclinometers so that the brackets 12 and 14 automatically measure the rotational position (inclination angle) of the brackets.

In the illustration shown in FIG. 1, the shafts 16 and 18 are shown connected to a pump 22 and a motor 24, respectively. It will be understood, that coupled shafts can be connected to a wide variety of machines and these are only representative examples. Likewise, the coupling 20 is intended to represent both simple and complex coupling systems.

As the shafts 16 and 18 are rotated, laser beams from the brackets 12 and 14 strike targets on the brackets 12 and 14, respectively, and generate data as to the radial displacement of the shafts 16 and 18, one with respect to the other, representing information as the angularity and the offset between the shafts 16 and 18, which the analyzer 30 calculates from the data.

As the brackets 12 and 14 are rotated to a plurality of different positions around the shafts 16 and 18, data points in the form of a rotational position (inclination angle) and a magnitude are transmitted to an analyzer 30 as indicated by the transmission symbols 26 and 28. The magnitude of the data represents the radial movement of the laser beam on a target. Thus, bracket 12 produces alignment data regarding the shaft 16 and bracket 14 produces alignment data regarding the shaft 18, but the data of each shaft is relative to the other. The data produced by both brackets 12 and 14 is collectively referred to as the alignment data.

The transmission symbols 26 and 28 represent a variety of ways that the information from the brackets 12 and 14 can be transmitted to the analyzer 30. In its most manual form, the data can be read by a user from indications on the brackets 12 and 14 and manually input into the analyzer 30. Preferably, however, the alignment data is automatically transmitted to the analyzer 30 by wire or wireless transmission, including infrared transmission and radio transmission.

The analyzer 30 includes keys 32 for allowing data and commands to be input by a user and a display 34 for indicating information to a user. The analyzer 30 is preferably a microprocessor based computer designed specifically for acquiring and analyzing alignment data to determine alignment and, in the present invention, to determine a machine condition. A CSI UltraSpec® 8000, programmed in accordance with the present invention, would be a suitable analyzer 30.

Data from the analyzer 30 may be downloaded to a computer by means of a data port 36, plug 38 and line 40 connected to a computer 42. The analyzer is capable of functioning fully independently of the computer 42, but it is convenient to download data for historical purposes.

Figure 2:
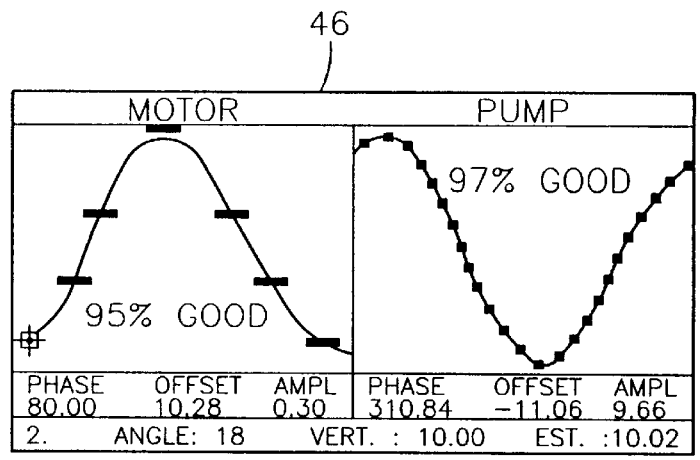
FIG. 2 illustrates a display of alignment data, a sine curve and a confidence factor for a machine in good condition.

Referring now to FIG. 2, there is shown a display of alignment data on the display 34 of analyzer 30. A cursor 44 shown on the display 46 is controlled by arrow keys and an enter key represented on the analyzer 30 as keys 32. The cursor may be moved on the display 34 from data point to data point using the arrow keys. To "click" on a particular position, the enter key is pressed.

The data shown in FIG. 2 indicates an 85% confidence factor in the data taken by the bracket 14 in the motor shaft, and an 87% confidence factor for the data taken by bracket 12 on the pump shaft. In both cases, the word "good" is displayed in addition to the confidence factor to indicate both that the data is believed to be accurate or good data representing the alignment or misalignment of the shafts 16 and 18 and that the condition of both the motor and pump appear to be good. In the preferred embodiment, the confidence factor is determined by first finding a best fit sine curve and then calculating the correlation between the data points and the best fit sine curve. Next, the confidence factor is adjusted downwardly based on the number of measurement points and the spacing of the points. In other words, confidence in the data is increased by having a large number of well spaced apart measurement parts. For example, if only three points were taken and those points were very closely adjacent, one to the other, a sine curve could be fitted to those three points with a high correlation factor, even if the data points were totally inaccurate. Thus, even though the correlation between the data points and the sine curve would be high, the confidence factor will be low based on the number of points and the spacing. In the preferred embodiment, the adjustment factor is determined by the formula: $y/(x-2)$ where x is the number of points and y is the maximum adjustment factor desired. The adjustment factor is rounded to the nearest whole number. Preferably the analyzer 34 is programmed with this default formula and y=5, but the user is given an option of changing the formula as desired. For example, the user could increase or decrease "y" to change the degree to which confidence is adjusted based on the number of points. The user may also substitute any desired formula so long as x is provided as representing the number of points.

Using the default formula where y=5, it will be appreciated that any number of points in excess of 12 will result in an adjustment factor of less than ½, which will be rounded to 0, and no negative adjustment will occur based on the number of points.

After adjusting the confidence factor for the number of points, the analyzer 34 adjusts the confidence factor based on "spacing" of the points. As used herein "spacing" refers to the mean distribution of the spacing between the points. That is, good spacing requires a significant number of points that are well distributed rotationally without bunching. For example, the "spacing" in the preferred embodiment is determined by first determining a spacing value corresponding to the rotational distance between each adjacent measurement point. Next, determine the average spacing between the adjacent measurement points and determine the standard deviation for the complete set of points. Each spacing value is compared to the standard deviation. Preferably, the absolute value of the difference between the standard deviation and each spacing value is obtained. The percentage of spacings that are between two and three times the standard deviation (m) is calculated along with the percentage of spacings that are above three standard deviations (n). Then, the adjustment factor ($af_{spacing}$) is calculated as follows: $af_{spacing}=(m+2n)/4$. For example, if 36 points are acquired, the average spacing will be 10°. Nine spacings were found to meet the two to three standard deviation criteria and two were found to meet the greater than three standard deviation criteria. The adjustment factor will be $af_{spacing}=(25+(2\times5.5))/4=9$. Thus, the confidence factor would be reduced by 9%.

Again, the user is given the option of changing the default formula. For example, the "y" can be increased or decreased to change the maximum allowable adjustment factor for spacing, and the "z" can be increased or decreased to change the rate at which the adjustment factor will vary based on the determination of spacing. Alternatively, the user may substitute any formula that creates an adjustment factor dependent on spacing.

Figure 3A:
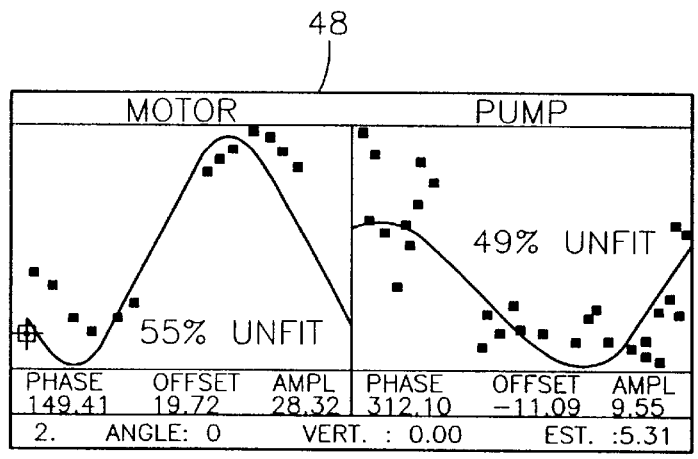
FIG. 3 represents displays from the analyzer indicating looseness of the alignment brackets or the machine.
Figure 3B:
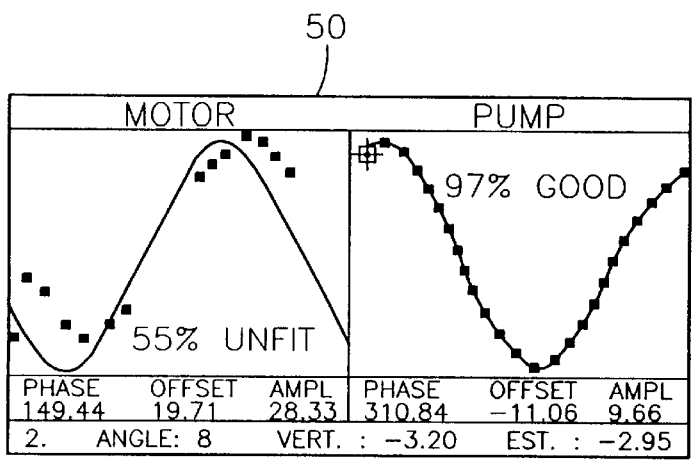

Referring now to FIG. 3, displays 48 and 50 represent displays of alignment data resulting from looseness, in this case looseness of the pump. It will be easily appreciated that the number of measurement points and the spacing of the measurement points is high for the measurement points shown in displays 48 and 50. Thus, the confidence factors shown on the display (69% poor, 87% good, 75% poor, 76% poor) are generated primarily by difficulty in correlating the data to a sine curve. Referring to display 48, the data shown therein is first collected and displayed without the word "looseness?". The user then inputs commands through the keyboard 32 utilizing menus on the display 34 to enter into a routine "condition analysis" to determine whether the poor confidence factor is caused by loose brackets, a loose machine, or a fault in the machine. When the condition analysis is initiated, the user is prompted to choose either a manual analysis or an automatic analysis, which is selected by placing the cursor on the chosen analysis and pressing "enter". If a manual analysis is chosen, the user is prompted to identify a segment of data points to be removed from the alignment data in creating a trial set of alignment data. To do this, the user positions the cursor at the beginning of the segment to be removed and clicks "enter". The user then places the cursor at the end of the segment at the points to be removed. By just moving the cursor, the intervening measurement points are highlighted. When the desired segment is highlighted, the user presses "enter" again and the selected segment of measurement points is removed to create a trial set of measurement points. The analyzer then calculates a confidence factor for the trial set of measurment data. That is, the analyzer 34 finds a sine curve that best fits the trial set of data, it calculates a correlation percentage, and it downwardly adjust the correlation percentage by the usual adjustment factors to calculate a confidence factor. If the confidence factor for the trial set of data remains poor, the trial set of data is displayed with the poor confidence displayed and with an indication that looseness may be a problem. Preferably, the looseness indication is the word "looseness" with a "?" following it as shown in FIG. 3. After running the condition analysis, with the results described above, the looseness indication will preferably remain on the screen even after the original data is retrieved.

Figure 6A:
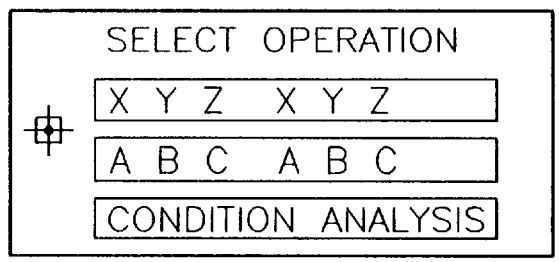
FIG. 6 shows a series of displays representing the initiation and performance of a condition analysis routine.
Figure 6B:
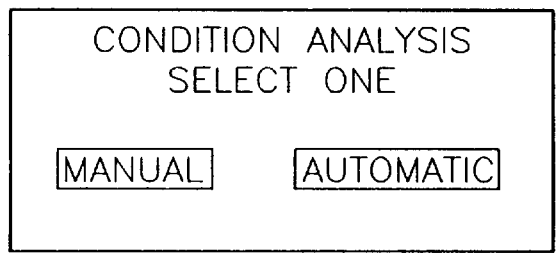
Figure 6C:
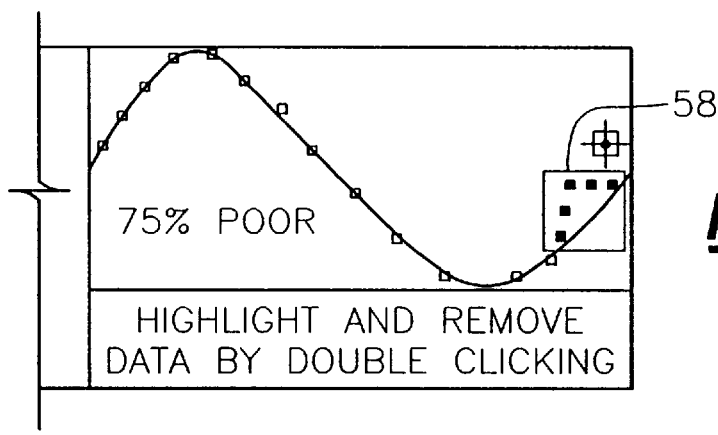
Figure 6D:
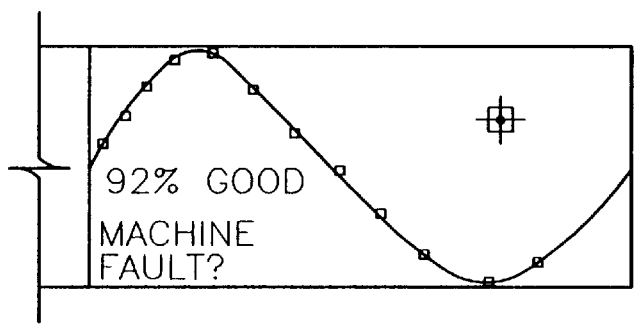

FIGS. 6a–6d show a representative series of displays for performing the condition analysis, which is begun by clicking on "Condition Analysis" (FIG. 6a) and then "Manual" (FIG. 6b). The data points 58 (FIG. 6c) are selected for removal by clicking on the leftmost, then rightmost, data point, and then a new confidence factor is calculated and displayed as shown in FIG. 6d. If the trial set produces a "GOOD" confidence factor then "Machine Fault?" is also displayed.

The display sequence for selecting the automatic mode is the same as described above except FIG. 6c is omitted since the analyzer seeks out the trial set having the best confidence factor, as described below.

Display 48 in FIG. 3 shows a situation in which a poor confidence factor was found when Condition Analysis was performed. The brackets were rechecked and tightened to determine whether the looseness problem was not generated from the brackets themselves. A second set of alignment data was acquired, and the condition analysis was performed again resulting in the data of display 50. In the display 50 of FIG. 3, the looseness problem was removed based on the above procedure, and the user has determined that loose brackets caused the low Confidence Factors.

The most common technique of beginning the condition analysis will be to manually select suspicious data. However, if no suspicious is readily apparent, an automatic analysis mode may be entered which automatically sweeps through a plurality of trial data sets and calculates a plurality of confidence factors based on those trial data sets. If any of the trial data sets produces a high confidence factor, this finding would counter-indicate looseness and it would suggest a machine condition fault. Curve parameters for the preferred embodiment of a sine wave are angular phase, magnitude and axis offset.

To set up the automatic analysis, the user is prompted through display 30 to select the size of the trial data set in degrees and the sweep increment size in degrees. For example, a user may select a trial data set size of 180° with a sweep increment of 30°. In such case, the analyzer 34 would first use a trial set composed of the measurement points between 0 and 180°. The second trial set would be incremented forward 30° and would be defined between 30° and 210°. The third trial set is incremented forward 30° more, and so on until 12 trial data sets are analyzed. The curve parameters and confidence factor for all trial data sets are determined. Those trial data sets in which the curve parameters that are consistent,(e.g., the same, one with respect to the others, within a predetermined range, preferably ±10%) contain the misalignment information. The information that is not from misalignment is removed from the analysis by initially removing the trial set with the lowest confidence factor. Points are individually added back into the analysis and the curve fit repeated until the confidence factor decreases. Preferably, the points are added back in an order based on the closeness of each point to the data that was not removed. This analyzed data set is displayed along with its curve parameters and confidence factor, to indicate whether a possible machine fault condition (FIG. 6d) or looseness (FIG. 3a) has been diagnosed.

Figure 4A:
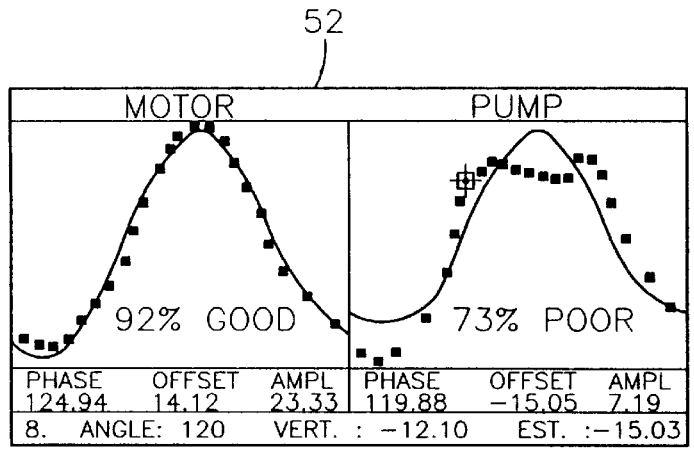
FIG. 4 represents displays of the analyzer indicating a machine fault condition such as a rotor rub.
Figure 4B:
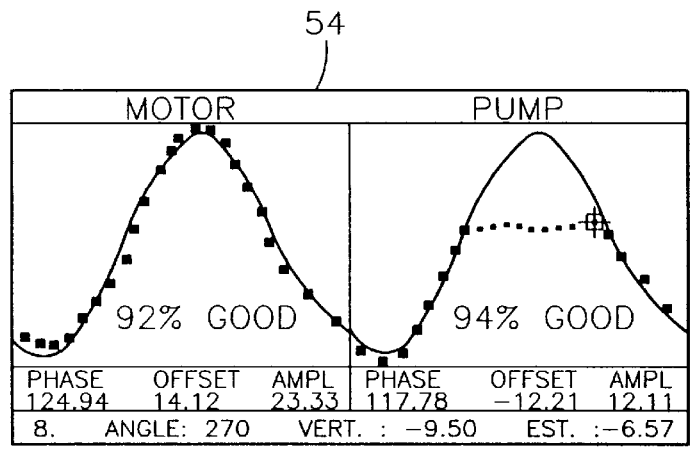

Displays 52 and 54 of FIG. 4 show displays representative of a rotationally isolated machine fault. In display 52, all of the data points are shown and the confidence factor is poor primarily because the correlation between the data points and the best fit sine curve is poor. However, when suspicious data is removed and the resulting trial set of data is analyzed, correlation and the confidence factor is very high. This suggests a machine fault, which is indicated by the words "machine fault?" on the display. It is rotationally isolated because the data corrupted by the fault appears in a distinct "isolated" portion of the rotation of shafts 16 and 18.

Figure 5:
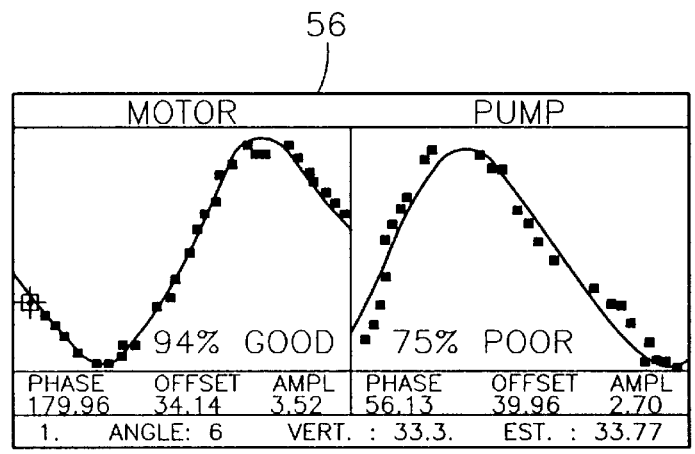
FIG. 5 represents a display of the analyzer suggesting a bearing fault condition.
Figure 7A:
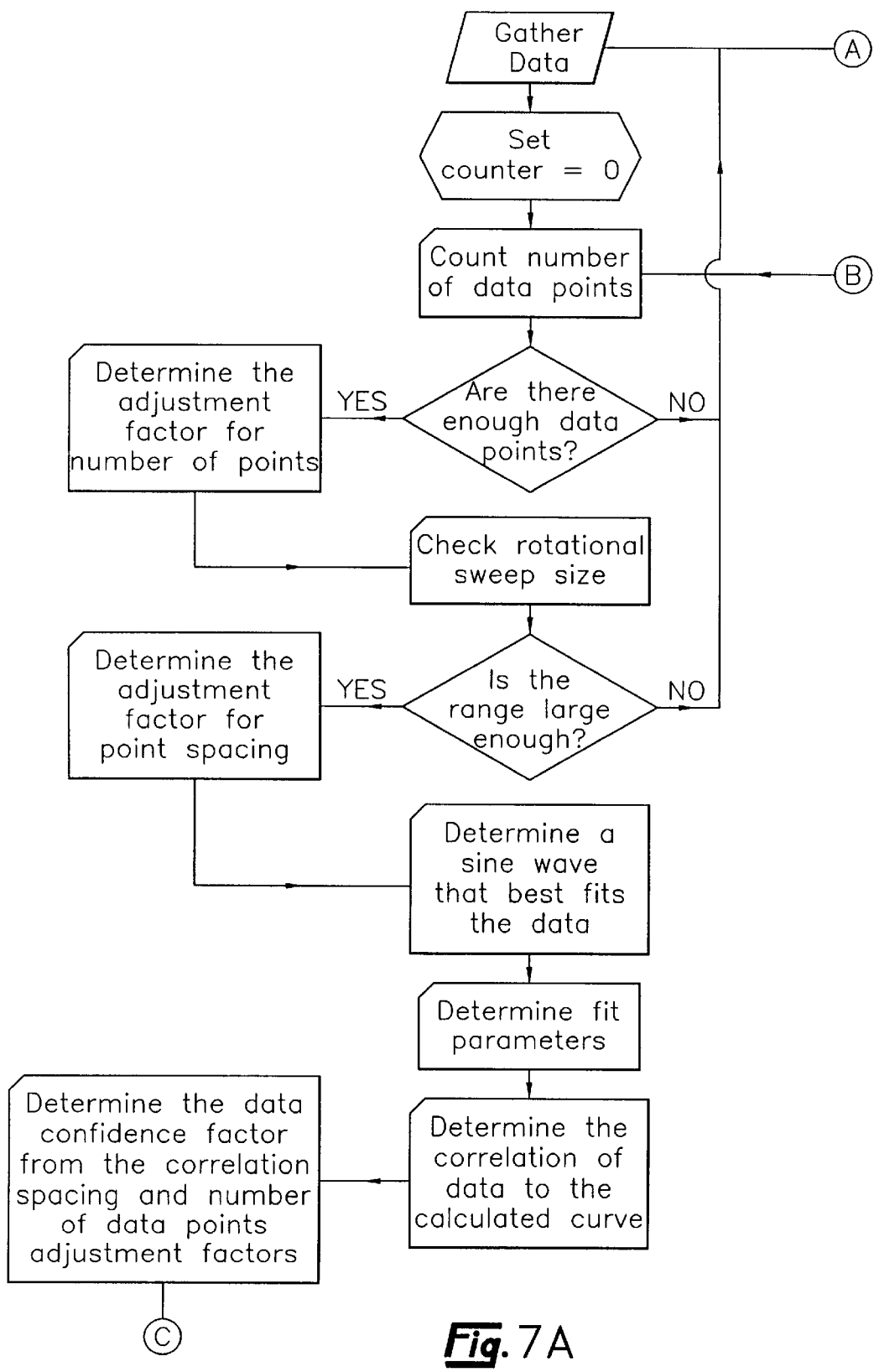
FIG. 7 is a flow chart illustrating operation of the analyzer in the mode for analyzing a machine condition.
Figure 7B:
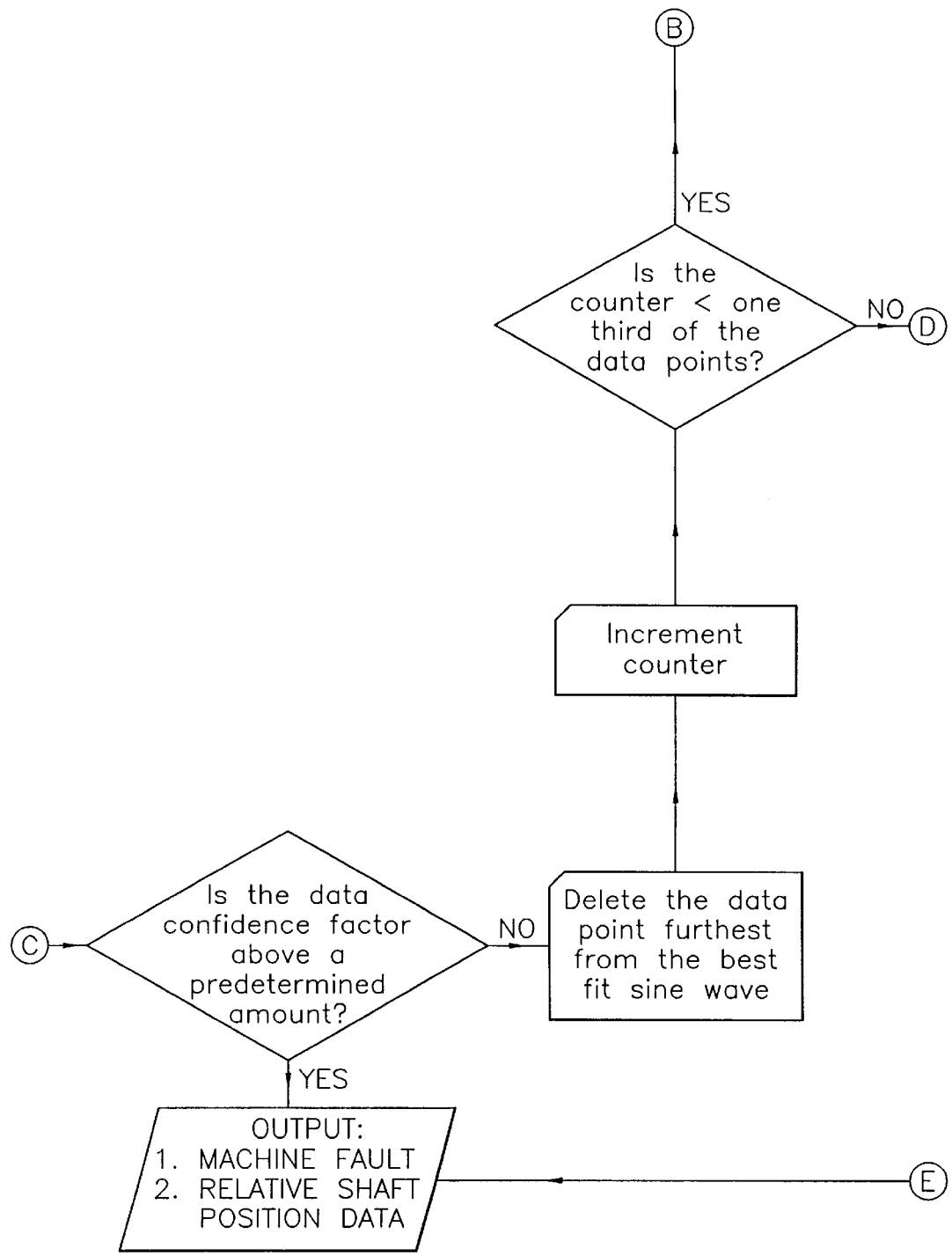
Figure 7C:
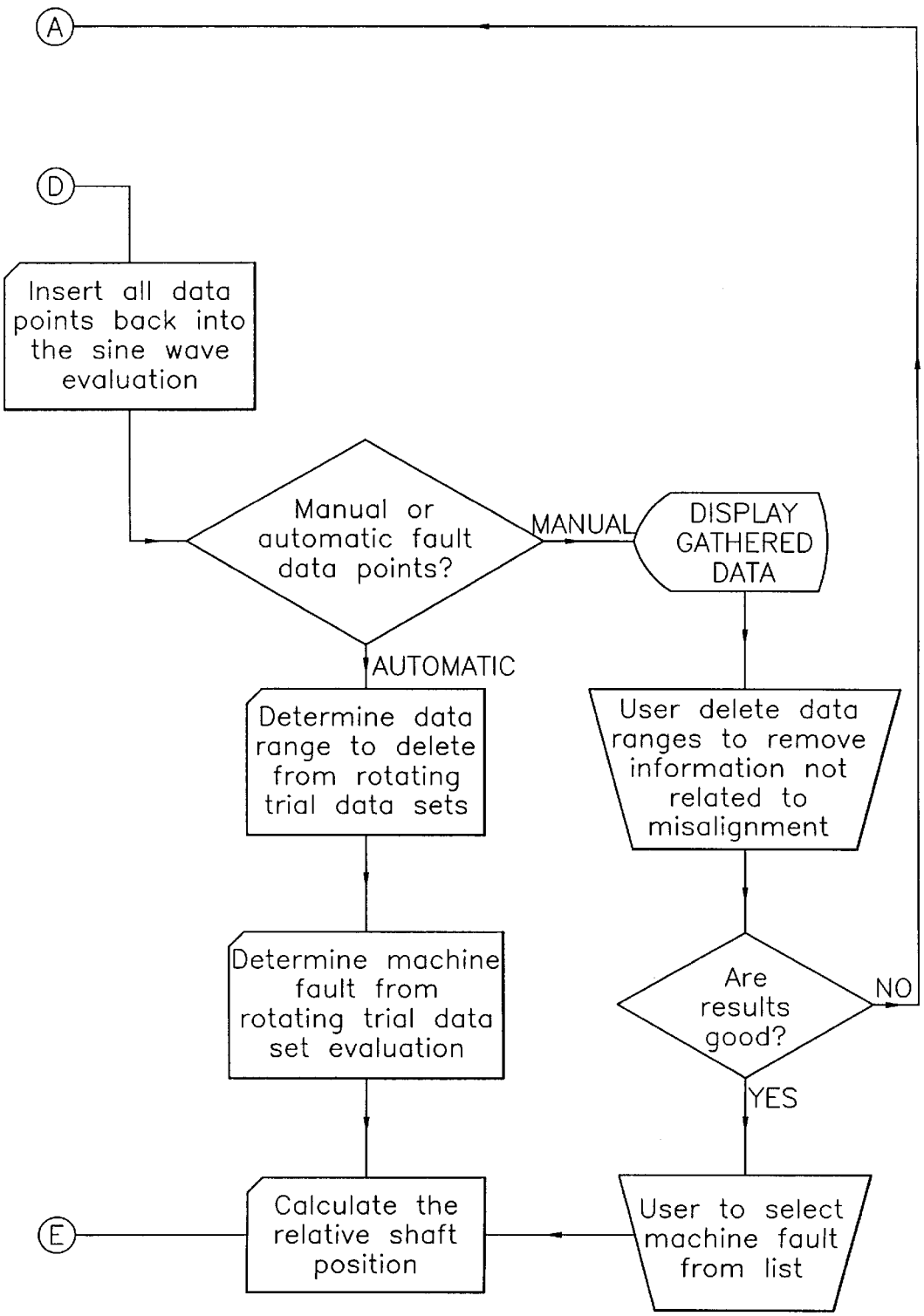

The analyzer 34, upon detecting a machine fault further analyzes the data to determine whether the machine fault appears to be a bearing fault or a major component fault, such as a rub. To make this determination, the analyzer compares the size of the removed segment of data to predetermine criteria, and it also compares other predetermined criteria to the amplitude of the best fit sine curve for the trial data set. In the preferred embodiment, if the removed segment of data from the trial data set is greater than 60° and the amplitude of the aforementioned sine curve is greater than 9 mils (0.009 inch), the analyzer will indicate the presence of a major component fault, such as a rub, as shown in display 54 of FIG. 4. If the segment size is less than 60° and the amplitude of the sine curve is less than 5 mils (0.005 inch), the analyzer will indicate the probable presence of a bearing fault such as a bearing spall. The magnitude of the predetermined criteria for determining a major component fault or a bearing fault can be adjusted by the user during set up procedures. While it is preferred to provide fault suggestions by displaying words on a display, it will be understood that other types of indications could be used, such as a flashing light or a signal provided to a computer. Also, graphical indications of the fault may be provided such as the display of an icon representing a particular fault condition or the display of a box around the data caused by the fault condition such as shown in display 56 of FIG. 5. While it is believed that the operation and programming of the analyzer 30 have been fully described above, a flow chart is provided as FIG. 7 to further clarify the programming and operation of analyzer 30 that is particularly relevant to the present invention.

While a preferred enbodiment of the invention has been described in the foregoing detailed description, it will be appreciated that numerous rearrangements, modifications and substitutions of parts are possible without departing from the scope of the invention.

I claim:

1. An apparatus for determining the condition of a machine having a first shaft coupled to a second shaft, comprising:

alignment fixtures for producing alignment data composed of a plurality of data points having purportedly corresponding to the misalignment between the first and second shafts measured at a plurality of rotational positions relative to said shafts;

an alignment analyzer having an input for receiving the alignment data, said analyzer for finding a curve of a predetermined type that best fits the alignment data, and for analyzing the alignment data and the curve to produce a confidence factor indicating the probability that the alignment data actually corresponds to the misalignment of the first and second shafts; and an output associated with said analyzer for outputting information corresponding to the alignment data including information based on said confidence factor.

2. The apparatus of claim 1 wherein said analyzer further comprises means for analyzing the alignment data and the curve for determining a condition other than misalignment of the first and second shafts that contributed to the magnitudes of the alignment data and for selectively producing a condition signal for being transmitted to the output.

3. The apparatus of claim 1 wherein said analyzer further comprises means for analyzing the alignment data and the curve for determining whether a bearing defect contributed to the magnitudes of the alignment data and for selectively producing a bearing defect signal for being transmitted to said output.

4. The apparatus of claim 1 wherein said analyzer further comprises means for analyzing the alignment data and the curve for determining whether a machine rub contributed to the magnitudes of the alignment data and for selectively producing a machine defect signal for being transmitted to the output.

5. The apparatus of claim 1 wherein said analyzer further comprises means for analyzing the number of data points in the alignment data, the rotational spacing between the data points, and the correlation between the alignment data and the curve, and for determining the confidence factor based on the analysis of the number, spacing and correlation of the data points.

6. The apparatus of claim 1 wherein said analyzer further comprises means for deleting selected ones of said data points from the alignment data to produce a trial data set of alignment data and for determining a confidence factor based in part on said trial data set of alignment data.

7. The apparatus of claim 1 wherein said analyzer further comprises means for deleting selected segments of data points from the alignment data to produce a trial data set of alignment data and for determining a confidence factor based in part on said trial data set of alignment data.

8. The apparatus of claim 1 further comprising:

an input user interface for producing input commands in response to a user;

said analyzer in response to the input commands being operable to remove selected data points from the alignment data to produce a trial data set of alignment data, said analyzer being further operable to produce a confidence factor based in part on said trial set of alignment data.

9. The apparatus of claim 1 wherein said analyzer further comprises:

means for producing a plurality of trial data sets, each trial data set different from the others, and each trial data set corresponding to said alignment data with a unique selected segment of data points removed from said alignment data;

means for finding a curve of a predetermined type for each trial data set that best fits the trial data set to thereby produce a plurality of best fit curves, one for each trial data set;

means for analyzing the plurality of trial data sets and their respective best fit curves for determining a plurality of trial data characteristics, one trial data characteristic for each trial data set; and means for making a determination of a condition of the machine based on at least one of the trial data characteristics.

10. The apparatus of claim 9 wherein said means for analyzing further comprises means for determining a plurality of trial curve parameters, one set of curve parameters for each trial data set and wherein the determination of a condition of the machine is based in part on the trial curve parameters.

11. The apparatus of claim 10 wherein said trial curve parameters comprise phase, offset and amplitude of the trial best fit curves.

12. The apparatus of claim 9 wherein said means for analyzing further comprises means for determining a plurality of trial confidence factors, one trial confidence factor for each trial data set and wherein the determination of a condition of the machine is based in part on at least one of the trial confidence factors.

13. The apparatus of claim 12 wherein said means for analyzing further comprises means for determining a plurality of trial confidence factors and trial curve parameters, one trial confidence factor and one set of trial curve parameters for each trial data set and wherein the determination of a condition of the machine is based in part on at least one of the trial curve parameters and at least one of the trial confidence factors.

14. The apparatus of claim 12 wherein said means for making a determination further comprises means for determining whether all of the trial confidence factors meet predetermined criteria indicating that either the brackets or the machine is loose and for selectively producing a loose signal for being transmitted to the said output.

15. The apparatus of claim 12 wherein said means for determining further comprises means for identifying the largest of the trial confidence factors and for comparing the largest trial confidence factor to predetermined criteria indicating whether a rotationally isolated machine fault exists in the machine and for selectively producing a machine fault signal for being transmitted to said output.

16. The apparatus of claim 12 wherein said means for making a determination further comprises means for identifying the largest of the trial confidence factors and for comparing the largest trial confidence factor and the trial data set corresponding to the largest trial confidence factor to predetermined criteria indicating whether a rub condition exists in the machine and for selectively producing a rub signal for being transmitted to said output.

17. The apparatus of claim 9 wherein said means for making a determination further comprises means for identifying the largest of the trial confidence factors and for comparing the largest trial confidence factor and the trial data set corresponding to the largest trial confidence factor to predetermined criteria indicating the presence of a bearing spall in the machine and for selectively producing a spall signal for being transmitted to said output.

18. The apparatus of claim 1 further comprising:
said output including a visual display;
said analyzer for transmitting signals to said display and displaying a Cartesian coordinate graph showing the best fit curve and the data points;
input means for selecting a segment composed of a plurality of data points; and
said analyzer for responding to a selection of a segment to produce a trial data set corresponding to the alignment data with data removed based on the selected segment.

19. The apparatus of claim 1 further comprising:
means for determining the correlation between the curve and the alignment data and producing a temporary confidence factor; and
means for determining an adjustment factor that is inversely proportional to the number of data points in the alignment data and for reducing the magnitude of the temporary confidence factor by the magnitude of the adjustment factor to produce the confidence factor.

20. The apparatus of claim 1 wherein said analyzer further comprises:
means for determining the correlation between the curve and the alignment data and producing a temporary confidence factor; and
means for determining an adjustment factor that is inversely proportional to the rotational spacing of data points in the alignment data and for reducing the magnitude of the temporary confidence factor by the magnitude of the adjustment factor to produce the confidence factor.

21. The apparatus of claim 1 wherein said analyzer further comprises:
means for determining the correlation between the curve and the alignment data and producing a temporary confidence factor; and
means for determining an adjustment factor that is inversely proportional to the spacing and number of data points in the alignment data and for reducing the magnitude of the temporary confidence factor by the magnitude of the adjustment factor to produce the confidence factor.

22. The apparatus of claim 1 wherein said analyzer finds a sine curve that best fits the alignment data.

23. An apparatus for determining the condition of a machine having a first shaft coupled to a second shaft, comprising:
alignment fixtures for producing alignment data composed of a plurality of data points purportedly corresponding to the misalignment between the first and second shafts measured at a plurality of rotational positions relative to said shafts;
an alignment analyzer having an input for receiving the alignment data, said analyzer for finding a best fit curve of a predetermined type that best fits the alignment data and for analyzing the alignment data to determine whether a rotationally isolated machine fault exists and for selectively producing a machine fault signal; and
an output associated with said analyzer for outputting information corresponding to the alignment data including information based on said machine fault signal.

24. The apparatus of claim 23 wherein said analyzer means further comprises means for deleting selected ones of said data points from the alignment data to produce a trial set of alignment data and for determining whether a rotationally isolated machine fault exists based in part on said trial set of alignment data.

25. The apparatus of claim 23 wherein said analyzer further comprises:
means for deleting selected ones of said data points from the alignment data to produce a trial data set of alignment data;
means for finding a best fit curve of a predetermined type that best fits the trial data set;
means for analyzing the trial data set and the best fit curve for determining at least a correlation between the trial data set and the best fit curve; and
means for making a determination of whether a rotationally isolated machine fault exists based on the correlation.

26. The apparatus of claim 23 wherein said analyzer further comprises:
means for producing a plurality of trial data sets, each trial data set different from the others, and each trial data set corresponding to said alignment data with a unique selected segment of data points removed from said alignment data;

means for finding a curve of a predetermined type for each trial data set that best fits the trial data set to thereby produce a plurality of trial best fit curves, one for each trial data set;

means for analyzing the plurality of trial data sets and their respective trial best fit curves for determining a plurality of trial correlations, one trial correlation for each trial data set; and means for making a determination of the existence of a rotationally isolated machine fault based in part on the trial correlations.

27. The apparatus of claim 23 further comprising:

said output including a visual display;

said analyzer for transmitting signals to said display and displaying a Cartesian coordinate graph showing the best fit curve and the data points;

input means for selecting a segment composed of a plurality of data points; and said analyzer for responding to a selection of a segment to produce a trial data set corresponding to the alignment data with the selected segment removed, for finding a trial best fit curve of a predetermined type that best fits the trial data set, for determining a correlation between the trial best fit curve and the trial data set, and for comparing the correlation to predetermined criteria to determine whether a rotationally isolated machine fault exists.

28. The apparatus of claim 23 wherein said analyzer further comprises:

means for deleting a selected segment of said data points of a selected rotational size from the alignment data to produce a trial data set of alignment data;

means for finding a trial best fit curve of a predetermined type that best fits the trial data set;

means for analyzing the trial data set and the trial best fit curve for determining at least a correlation between the trial data set and the trial best fit curve; and means for making a determination of whether a rotationally isolated machine fault exists based on the correlation and, if a rotationally isolated machine fault exists, determining the type of machine fault based on the rotational size of the segment and the amplitude of the best fit curve.

29. The apparatus of claim 23 wherein said means for analyzing further comprises means for determining a curve fit parameter for the best fit curve and wherein the determination of whether a rotationally isolated machine fault exists is based in part on at least one of the curve parameters.

30. The apparatus of claim 29 wherein said means for determining a trial fit parameter further comprises means for determining phase, offset and amplitude of the best fit curve.

31. The apparatus of claim 23 wherein said means for analyzing further comprises:

means for deleting a selected segment of said data points of a selected rotational size from the alignment data to produce a trial data set of alignment data;

means for finding a trial best fit curve of a predetermined type that best fits the trial data set;

means for analyzing the trial data set and the trial best fit curve for determining at least a confidence factor based on the trial data set and the trial best fit curve; and means for making a determination of whether a rotationally isolated machine fault exists based on the confidence factor.

32. The apparatus of claim 23 wherein said means for analyzing further comprises:

means for deleting a selected segment of said data points of a selected rotational size from the alignment data to produce a trial data set of alignment data;

means for finding a trial best fit curve of a predetermined type that best fits the trial data set;

means for analyzing the trial data set and the trial best fit curve for determining at least a curve fit parameter; and means for making a determination of whether a rotationally isolated machine fault exists based on the curve fit parameter.

33. The apparatus of claim 32 wherein said means for analyzing further comprises means for determining phase, offset and amplitude of said trial best fit curve.

34. The apparatus of claim 23 wherein said means for analyzing further comprises:

means for deleting a selected segment of said data points of a selected rotational size from the alignment data to produce a trial data set of alignment data;

means for finding a trial best fit curve of a predetermined type that best fits the trial data set;

means for analyzing the trial data set and the trial best fit curve for determining at least a confidence factor and a curve fit parameter; and means for making a determination of whether a rotationally isolated machine fault exists based on the confidence factor and the curve fit parameter.

35. The apparatus of claim 23 wherein said means for analyzing further comprises:

means for producing a plurality of trial data sets, each trial data set different from the others, and each trial data set corresponding to said alignment data with a unique selected segment of data points removed from said alignment data;

means for finding a curve of a predetermined type for each trial data set that best fits the trial data set to thereby produce a plurality of trial best fit curves, one for each trial data set;

means for analyzing the plurality of trial data sets and their respective trial best fit curves for determining a plurality of trial correlations and a plurality of trial curve parameters, one trial correlation and one set of curve parameters for each trial data set; and means for analyzing the correlations and the curve parameters to identify a segment of data points caused in part by a rotationally isolated machine fault.

36. A method for determining the condition of a machine having a first shaft coupled to a second shaft, comprising:

producing alignment data composed of a plurality of data points purportedly corresponding to the misalignment between the first and second shafts measured at a plurality of rotational positions relative to said shafts;

finding a curve of a predetermined type that best fits the alignment data; and analyzing the alignment data and the curve and producing a confidence factor indicating the probability that the alignment data actually corresponds to the misalignment of the first and second shafts.

37. The method of claim 36 further comprising analyzing the alignment data and the curve for determining whether a bearing defect contributed to the magnitudes of the alignment data.

38. The method of claim 36 further comprising analyzing the alignment data and the curve for determining whether a machine rub contributed to the magnitudes of the alignment data and for selectively producing a machine defect signal for being transmitted to the output.

39. The method of claim 36 wherein said analyzing further comprises analyzing the number of data points in the alignment data, the rotational spacing between the data points, and the correlation between the alignment data and the curve, and determining the confidence factor based on the analysis of the number, spacing and correlation of the data points.

40. A method for determining the condition of a machine having a first shaft coupled to a second shaft, comprising:

producing alignment data composed of a plurality of data points purportedly corresponding to the misalignment between the first and second shafts measured at a plurality of rotational positions relative to said shafts;

finding a best fit curve of a predetermined type that best fits the alignment data, and analyzing the alignment data to determine whether a rotationally isolated machine fault exists; and selectively producing a machine fault signal based on the analyzing step.

41. The method of claim 40 wherein said analyzing step further comprises deleting selected ones of said data points from the alignment data to produce a trial set of alignment data and determining whether a rotationally isolated machine fault exists based in part on said trial set of alignment data.

42. The method of claim 40 wherein said analyzing step further comprises:

deleting selected ones of said data points from the alignment data to produce a trial data set of alignment data;

finding a best fit curve of a predetermined type that best fits the trial data set;

analyzing the trial data set and the best fit curve for determining at least a correlation between the trial data set and the best fit curve; and making a determination of whether a rotationally isolated machine fault exists based on the correlation.

43. The method of claim 40 wherein said analyzing further comprises:

deleting a selected segment of said data points of a selected rotational size from the alignment data to produce a trial data set of alignment data;

finding a trial best fit curve of a predetermined type that best fits the trial data set;

analyzing the trial data set and the trial best fit curve for determining at least a correlation between the trial data set and the trial best fit curve; and making a determination of whether a rotationally isolated machine fault exists based on the correlation and, if a rotationally isolated machine fault exists, determining the type of machine fault based on the rotational size of the segment and the amplitude of the best fit curve.

* * * * *